United States Patent [19]

Crowe et al.

[11] Patent Number: 5,003,441
[45] Date of Patent: Mar. 26, 1991

[54] POP-UP LIGHT FIXTURE

[76] Inventors: John R. Crowe, P.O. Box 199, Solana Beach, Calif. 92056; Gregory A. Cheatham, 3784 B Mission, #336, Oceanside, Calif. 92054

[21] Appl. No.: 374,526

[22] Filed: Jun. 30, 1989

[51] Int. Cl.⁵ .............................................. F21L 7/00
[52] U.S. Cl. .................................. 362/183; 362/285; 362/286; 362/802
[58] Field of Search ............... 362/285, 286, 183, 802, 362/20, 145, 147, 418, 65, 74

[56] References Cited

U.S. PATENT DOCUMENTS

| | | | |
|---|---|---|---|
| 2,738,492 | 3/1956 | Arneson et al. | 362/74 |
| 4,180,850 | 12/1979 | Bivens | 362/418 |
| 4,410,930 | 10/1983 | Yachabach | 362/802 |
| 4,802,065 | 1/1989 | Minter et al. | 362/20 |

FOREIGN PATENT DOCUMENTS 93637  6/1983  Japan ..................................... 362/65

Primary Examiner—James C. Yeung
Attorney, Agent, or Firm—Dressler, Goldsmith, Shore, Sutker & Milnamow

[57] ABSTRACT

A terrain light fixture has a hollow body that is normally sunk within the ground, and a movable member disposed to telescope between a position retracted within the body and substantially flush with the ground surface and a position extended above the ground surface. The moveable member carries a light source, typically a 12 v.d.c. high intensity light bulb, that is energized in the extended position of the moveable member. The motive force to move the member is provided by an electrical lift mechanism, preferably either an electric motor or a shape-memory alloy. The motor-based lift mechanism operates equivalently to the power antenna of an automobile. The shape-memory alloy is typically configured as a spring. The application of electrical energization to both the light source and to the lift mechanism is preferably enabled by a switch that is responsive to sensed ambient light conditions. The energizing power may be external, or may be provided by an internal battery which is rechargeable from a solar array.

23 Claims, 3 Drawing Sheets

POP-UP LIGHT FIXTURE

BACKGROUND OF THE INVENTION

1. Field of the Invention

The present invention relates to lighting fixtures, particularly terrain lighting fixtures adapted for landscape lighting applications. The present invention also relates to lighting fixtures adapted for spatially moving between extended operating positions and retracted non-operating positions.

2. Background of the Invention

Terrain lighting is a type of exterior lighting where light fixtures are placed in close proximity to the ground and/or to vegetation. This particular type of outdoor lighting is popular with building and landscape architects because the nighttime play of light on landscape, vegetation, and artifacts such as buildings is aesthetically pleasing. This type of terrain lighting is especially popular in the southwestern or "sunbelt" states of the U.S. where decorative landscape lighting is used to support activities conducted out of doors because of favorable weather conditions.

Terrain landscape lighting fixtures, which generally protrude above the ground in order to perform their illumination function, are not generally perceived to be equally as aesthetically pleasing during hours of daylight as is the illumination which such fixtures provide during hours of darkness. The above-ground fixtures often appear incongruous with surrounding vegetation. They are generally required to be made of expensive and high-quality materials, typically non-corrosive metals such as aluminum alloys, so as to be reasonably durable and resistant to damage, and so as not to appear shabby. Accordingly, they look distinctly man-made and unnatural.

Terrain lighting fixtures placed anyplace in the landscape, and particularly within lawns adjacent a sidewalk or pathway, present objects over which a person may fall. The fixtures are subject to damage by irrigation watering, animals and vehicles. To resist damage they must present significant strength and resistance to the elements, which increases cost.

Maintenance of the landscape, such as by mowing, in the vicinity of terrain lighting fixtures is difficult. The vegetation or grass is normally trimmed in the region of such fixtures by use of hand shears or a string trimmer. This required trimming is a separate, time-consuming task to normal lawn mowing.

Because of these difficulties with standard terrain lighting fixtures, there has been at least one previous attempt to provide a terrain lighting fixture that retracts to an innocuous and safe position below ground during periods of non use, and which extends above ground during periods of use in order to light an adjacent landscape area. Such a RETRACTABLE LIGHT FIXTURE is taught in U.S. patent Ser. No. 4,180,850 to Bivens.

The retractable light fixture of Bivens is hydraulically operated for forcing a retractable member bearing a light bulb out of a buried housing when lighting is desired. The fixture must correspondingly be both plumbed, typically with water, and electrically wired. The necessity of plumbing a fixture with pressured fluid increases its installation cost. Each retractable light fixture is required to be able to retain fluid pressure, preferably without undue leakage, over a protracted period of time. The fluid must be reliably isolated from the electrical connections so that it does not cause destructive short circuits.

The retractable light fixtures of Bivens are actuated for preselected times and durations by use of an irrigation-type electrical controller or the like. Although a number of light fixtures within an area may be simultaneously enabled in response to a light-operated sensor, or else in response to manual actuation, the individual retractable light fixtures of Bivens are not individually actuable. Such individual actuation may be useful when different parts of the terrain under illumination become darker or lighter relatively earlier or later in the dawn and dusk diurnal cycles.

Accordingly, it would be desirable if the function of a retractable terrain lighting fixture could be realized in a lighting fixture that was relatively inexpensive to make, install and maintain relative to previous fixtures. Moreover, such a fixture would desirably permit discreet, local, control of one or more fixtures. For certain relatively inaccessible and/or highly visible locations where it is difficult even to wire, let alone plumb, a retractable light fixture, such a fixture might desirably be self-contained.

In another technical area, certain alloys of metals are known that exhibit what is called the shape-memory effect. If such alloys are plastically deformed at one temperature, they will completely recover their original shape upon being raised to a higher temperature. These higher temperatures can be induced by the conduction of electrical current through the alloys. In recovering their shape the metal alloys can produce a displacement or a force, or a combination of a displacement and a force, as a function of temperature. Shape-memory alloys have been exploited in mechanical and electrical mechanical control systems in order to provide a precise mechanical response to an electrically-induced temperature change.

Shape-memory alloys are discussed in the in *Scientific American*, Vol. 241 No. 5 pp. 74–82 (November 1979). The metals are also discussed in the article Shape Memory Affect Alloys for Robotic Devices by the same Schetky appearing in *ROBOTICS AGE*, July, 1984, pp. 13–17.

Shape-memory alloys are available from Memory Metals, Inc., 83 Keiler Avenue, Norwalk, Conn. 06854, and from other suppliers. Memory Metals, Inc. offers, under the Memrytec TM trademark, two-way memory alloy devices. In these devices, the shape-memory alloy returns to a "memorized shape" on both heating and cooling, and not just upon heating. Both two-way shape memory alloys, and standard one-way shape memory alloys, may commonly be formed as springs.

SUMMARY OF THE INVENTION

The present invention contemplates a retractable lighting fixture using an electrically powered, electromotive, lift mechanism. The electromotive lift mechanism may typically be either a motor, or a shape-memory alloy that is preferably in the configuration of a spring.

The electrical energization of either (i) the electromotive lift mechanism, (ii) the fixture's light source, or preferably both (iii) the lift mechanism and light source is preferably enabled by sensing ambient light illumination with a photosensor.

The power for the lift mechanism and the light source is optionally derived from a battery. The battery is optionally charged by a solar cell that is integral with the light fixture.

In one preferred embodiment in accordance with the present invention the retractable light fixture includes a hollow body having an opening into the body. A movable member is disposed within the body's opening and is adapted to slide through the opening between a first position substantially retracted into the body and a second position at least partially extended out of the body. The hollow body is typically sunk within the ground or other surface with its opening disposed upwards. The moveable member thus moves between a first position substantially at or below the ground surface to a second position extending above the ground surface.

A light source within the body provides light illumination external to the light fixture when the movable member is in its second position.

An electromotive lift mechanism, responsive to an electrical signal, is connected between the hollow body and the movable member for moving the moveable member from its first to its second position with a force derived from electrical power. It is preferred that the light source should be retained on the moveable member for moving therewith, but this is not essential.

The power source for the preferred embodiment of the retractable light fixture may be external, or may be an internal battery. In each case the power source is preferably direct current (d.c.).

A power switch within each individual fixture gates electrical power to the electrical light source and/or to the lift mechanism. The power switch preferably switches power to both the light source and lift mechanism in response to ambient light levels sensed by a photosensor.

The electrical lift mechanism is preferably either a motor or a shape-memory alloy. If it is a shape-memory alloy, then it is preferably electrically connected in series with the electrical light source. This means that the same electric current that serves to energize the light source also serves to deploy such light source from a retracted first position to an extended second position. The retracted first position is normally inside a body such as the ground, a wall, or a ceiling while the extended second position is normally outside such a body.

These and other aspects and attributes of the present invention will become increasingly clear on reference to the following drawings and accompanying specification.

DETAILED DESCRIPTION OF THE INVENTION

The pop-up light fixtures in accordance with the present invention are predominantly used in terrain, or landscape, lighting applications. However, they are not limited to such applications and may be used anywhere it is desired to selectively expose a light source, either to selectively obtain illumination or to selectively protect the light source and its fixture.

In one typical application light fixtures in accordance with the present invention are mounted within the ground, and operate to selectively extend above ground surface level so as to provide light illumination or else to retract within the ground so as to present a surface substantially flush with the ground level.

By their operation to retract within the ground the fixtures in accordance with the invention are unobtrusive, and do not present a safety hazard, in the retracted position that they normally assume during the hours of daylight. Because the fixtures and their contained light sources are sheltered against some physical and environmental hazards to their integrity in the retracted position, they may generally be less robust, and less expensive to construct, than permanently exposed fixtures. In their extended positions the fixtures provide light illumination which may be selectively directed, diffused, concentrated, colored, or otherwise manipulated in a manner generally common to outdoor landscape lights and to light fixtures in general.

Figure 1:
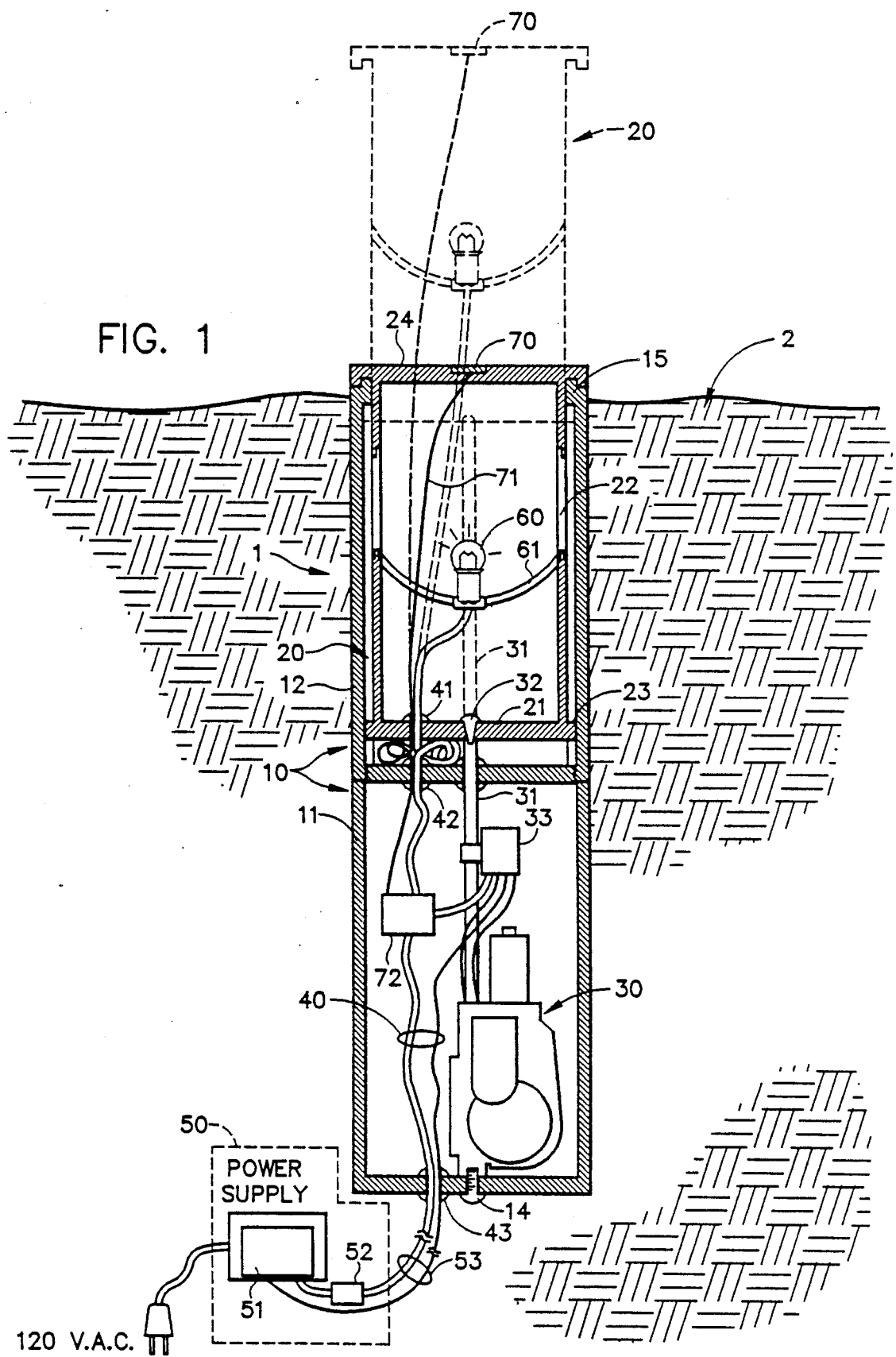
FIG. 1 is a cross sectional view showing a first embodiment of a pop-up light fixture in accordance with the present invention in its positions recessed within the ground and extended above the ground.

A first preferred embodiment of a pop-up light fixture 1 in accordance with the present invention is shown in FIG. 1. The fixture 1 is shown in a preferred position within a hole below the surface of ground 2. The fixture 1 is typically cylindrical in shape, but may alternatively assume the shape of a prism of any regular or irregular cross section. The fixture 1 normally extends perpendicular to the surface of ground 2, and longitudinally in the direction of the gravity vector. In such a position a moveable member 30 moves vertically between its recessed position (illustrated in solid line) and its deployed position (illustrated in dashed line). The fixture 1 may, however, be mounted at any angle relative to the surface of ground 2 or other surface, and relative to the gravity vector. It may, for example, be mounted horizontally within a wall and at a 90° angular rotation from that orientation shown in FIG. 1. It may alternatively be vertically mounted within a ceiling at a 180° angular rotation from the orientation shown in FIG. 1. The fixture 1 may be mounted outdoors and indoors, and in diverse environmental conditions. It may be, for example, used to selectively illuminate items such as art works on walls, to serve as an emergency beacon, or to mark a path or aisle.

The main structural members of fixture 1 include its housing 10 and its moveable member 20. The housing 10 is divided into a lower housing 11 that is attached to an upper housing 12, typically by a threaded attachment. The upper housing 12 normally screws as the female member over the male member presented by lower housing 11 in order to best guard against the ingress of water or dirt, but this relationship may be reversed. The housing 10 and moveable member 20 are typically constructed from high impact plastic, preferably polyvinyl chloride (PVC).

The lower housing 11 is normally sealed watertight. It contains most of the lift mechanism 30, and the wired connection 40 between an external power supply 50 and (indirectly) the light source 60 within the upper housing 20. The illustrated lift mechanism 30 is an electric motor and associated drive in the configuration of a power automobile radio antenna, such as Radio Shack part no. 12-1330. When the lift mechanism is economically based on a reliable mechanism of proven design that is alternatively used to raise and lower the antenna of an automobile, then it is affixed to lower housing 11 by screws 14 as required.

The power antenna lift mechanism 30 requires 12 v.d.c. power. This power is commonly provided by a power supply 50 containing a 120 v.a.c. to 12 v.a.c. step-down transformer 51, typically a Radio Shack part no. 12.6 CT, connected to a bridge rectifier 52, typically Radio Shack part no. 276-1171. The power supply 50 is commonly remotely located from fixture 1, typically above ground in weather protected surroundings. One power supply 50 may supply a number of fixtures 1, operating as a system, in electrical parallel.

Low voltage, 12 v.d.c., power is carried from power supply 50 to fixture 1 by wires 53, consisting of a positive voltage plus ground. The metal parts of the power antenna lift mechanism 30 that are within each of a number of light fixtures 1 employed in a single system are normally each connected to a common electrical ground, providing safety against electrically charging the fixtures in dry soils.

Figure 3:
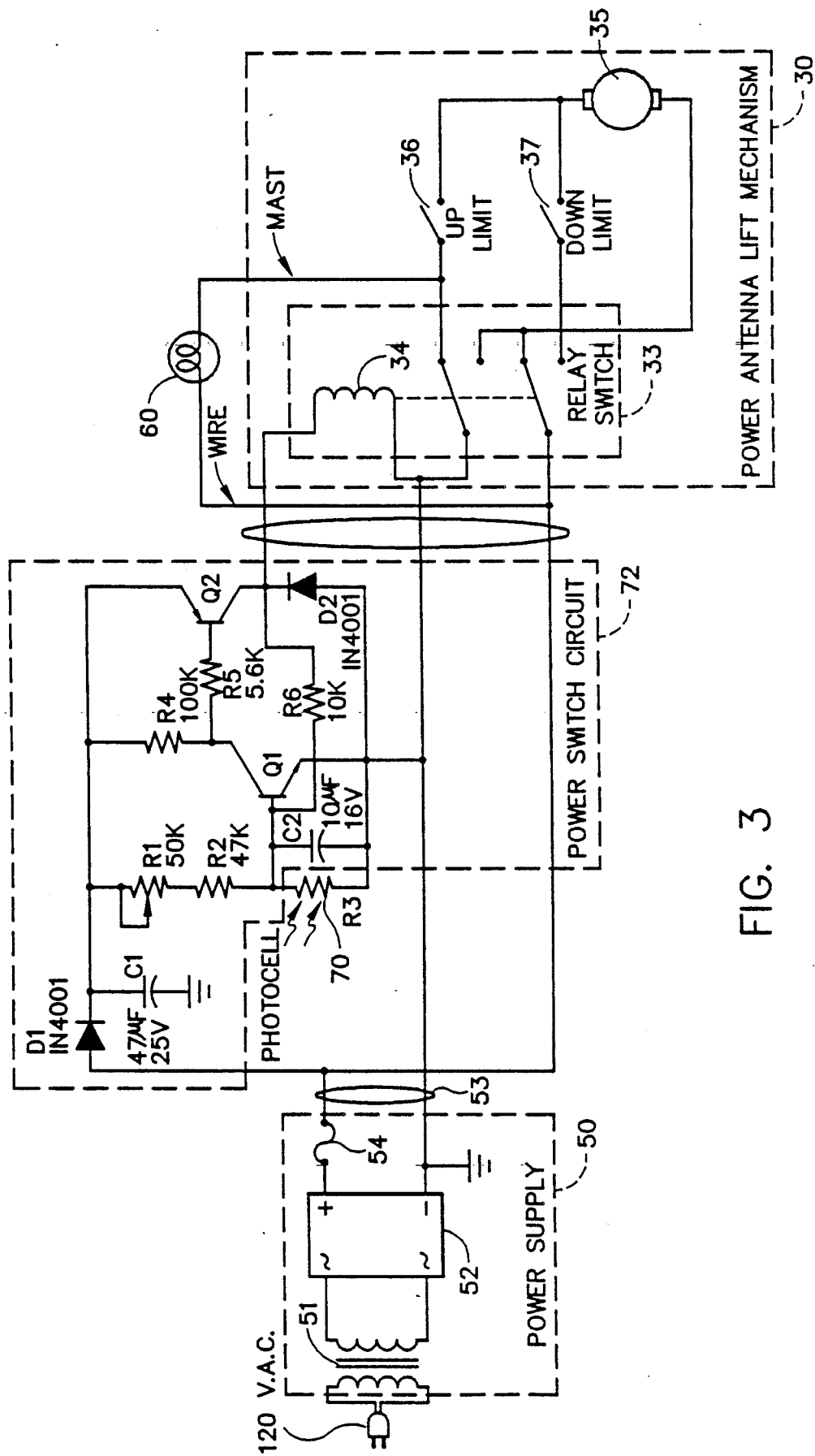
FIG. 3 is an electrical schematic diagram of that first embodiment of the pop-up light fixture in accordance with the present invention previously shown in FIG. 1.

Once the power and ground upon cable 53 are received into lower housing 11, the power to lift mechanism 30 and to light source 60 is preferably switched by the power switch circuit 72 (to be shown in the electrical schematic of FIG. 3). In accordance with the present invention, this switching is accomplished under control of a photocell, or photosensor, 70, typically a cadmium sulphide photocell, that connects via wires 71 to the power switch circuit 72.

The photosensor 70 and photosensor-activated power switch circuit 72 operate, in conjunction, to provide 12 v.d.c. power in electrical parallel to both lift mechanism 30 and to light source 60 on such times as the sensed ambient illumination is at a low level. At these times the power antenna lift mechanism 30 will be energized to extend its shooting tube assembly 31. The shooting tube assembly 31 is the automobile radio antenna portion of the lift mechanism 30 when such lift mechanism 30 is used for automobile radios. This shooting tube assembly 31 is connected, normally by stainless steel screw 32, to the base portion 21 of moveable member 20.

Responsive to the applied force, the moveable member 20 extends out of the upper housing 12 until it occupies the position illustrated in dashed line. At this position the light illumination from light source 60, typically a 12 watt, 12 volt, bayonet-base automotive-type quartz halogen lamp manufactured by Phillips Lighting Corporation or other parties, is visible to the exterior of lighting fixture 1.

The illumination produced by light source 60 is diffused exteriorly of lighting fixture 1 by light reflector 61, typically made of metalized reflective plastic, and also by light diffuser window, or lens, 22 of moveable member 20, typically made of transparent or translucent plastic. The light reflector 61 is typically a snap fit, and is held in position by tension forces exerted against a groove, or channel.

The exact extension length of the power antenna lift mechanism need not be precisely controlled because such mechanism incorporates internal protection, and will cease to apply a lifting force when a resistance of a certain magnitude is encountered. This resistance is encountered within the light fixture 1 in accordance with the present invention when the exterior flange 23 of moveable member 20 encounters a complementary interior flange 15 of upper housing 12. At this time the moveable member 20 will be substantially telescopically extended out of the housing 10, and above the surface of ground 2.

Because the photosensor 70 is directed upwards from its position on the opaque top surface 24 of moveable member 20, it is not significantly affected by the light illumination from light source 60. At such time as the ambient light conditions are sensed to be above a predetermined luminescence level, the signal from photosensor 70 to photosensor-activated power switch 72 via wire 71 will cause the cessation of the application of power to light source 60, and will cause a 0 v.d.c. signal to be applied to the relay switch 72 of power antenna lift mechanism 30. This 0 v.d.c. signal will cause the lift mechanism 30 to retract its shooting tube assembly 31, repositioning moveable member 20 within the upper housing 12 of light fixture 1.

Figure 2A:
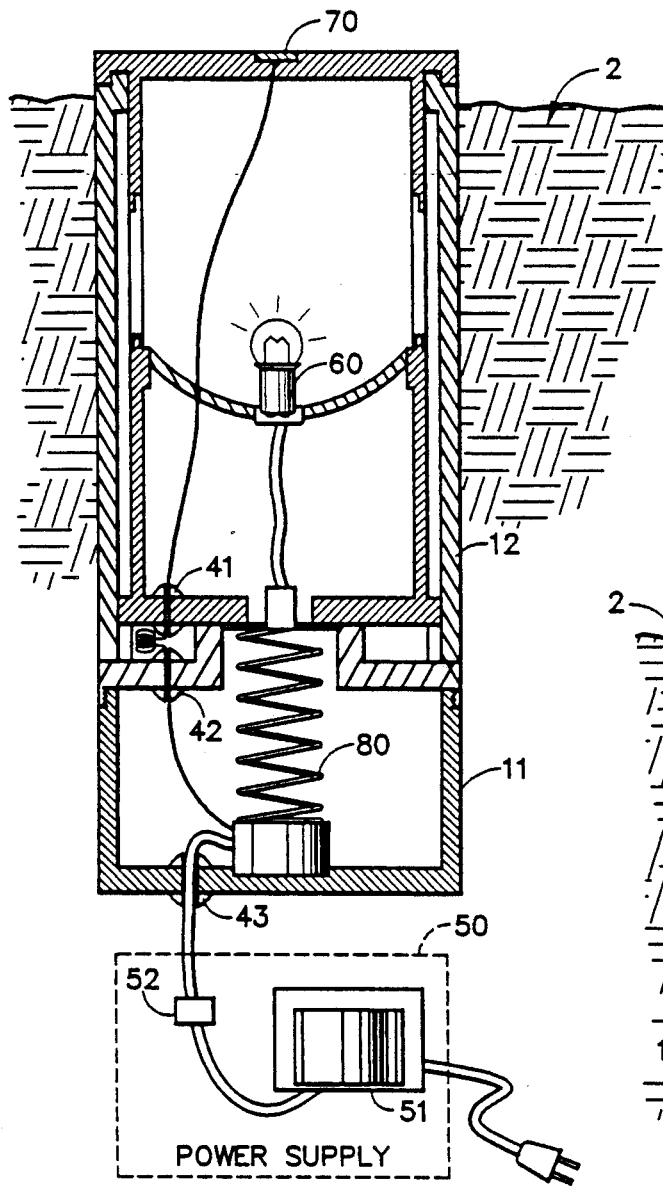
FIG. 2, consisting of FIG. 2a and FIG. 2b, is a cross sectional view of two variants of a second preferred embodiment of the pop-up light fixture in accordance with the present invention.
Figure 2B:
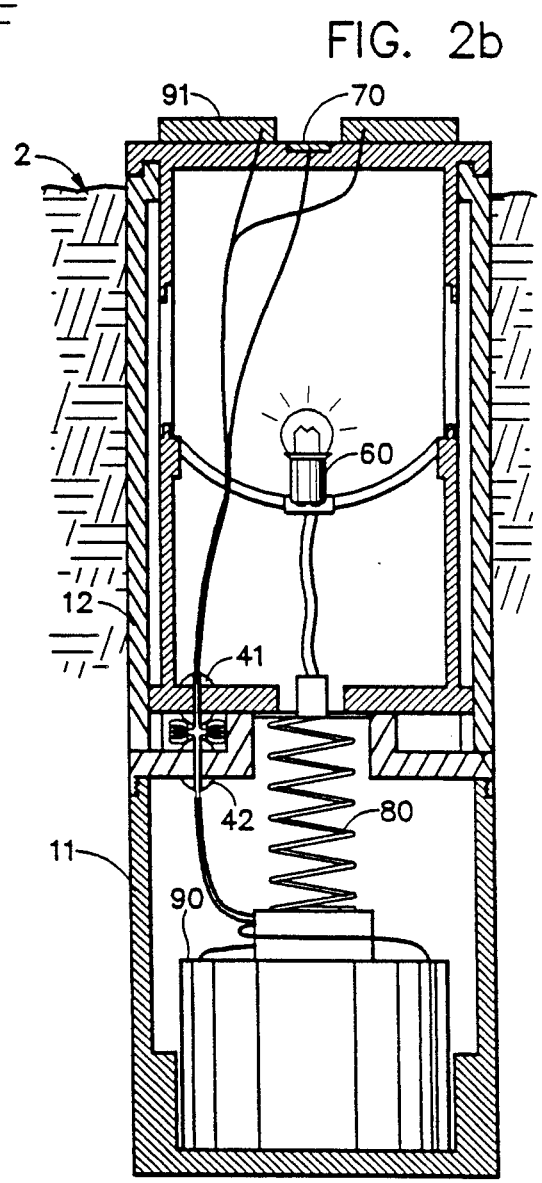

A second preferred embodiment of the present invention of a pop-up light fixture is shown in two variants in FIG. 2, consisting of FIG. 2a and FIG. 2b. Within this second embodiment the electromotive lift mechanism is implemented as a shape-memory alloy 80. The shape-memory alloy is preferably configured as a spring, as shown. It may be, for example, a shape-memory alloy available from Memory Metals, Inc., 83 kKeiler Avenue, Norwalk, Conn. 06854 or an equivalent shape-memory alloy available from other suppliers. The preferred shape-memory alloy 80 exhibits a predetermined resistance and expands upon being heated by electrical current. It contracts to the illustrated position during normal ambient outdoor temperatures with no electrical heating current.

It is possible, although not normally necessary, to use the Memrytec TM two-way memory alloy of the aforementioned Memory Metals, Inc. to produce a fixture 1 that will extend (or, alternatively if so configured) retract upon extreme, typically freezing, cold. In this manner light fixture 1 can be substantially protected against being stuck frozen in the ground in Northern climates, such as by the presence of snow or freezing rain.

In accordance with the present invention, the shape-memory alloy 80 electromotive lift mechanism is preferably energized by the same direct current that is otherwise used to supply the light source 60. In the variant shown in FIG. 2a, this direct current is supplied by the same power supply 50, consisting of transformer 51 and bridge rectifier 52, that was previously seen in FIG. 1. In that variant shown in FIG. 2b the direct current for both the shape-memory alloy 80 lift mechanism, and the light source 60, is provided by a battery 90. The battery 90 may optionally be a rechargeable type, for example nickel-cadmium, that is recharged by a solar array 91 typically located at the top of fixture 1.

The power to the light source 60 is preferably carried through the shape-memory alloy 80, which is electrically connected in series with the light source 60. In such a case an open circuit in either the light source 60, or in the shape-memory alloy 80, will cause the retractable light fixture to remain both (i) within the retracted position and (ii) unlit. Accordingly, failure of either the shape-memory alloy or the light source 60 may be readily observed. The series connection simplifies assembly.

In the variant second embodiment illustrated in FIG. 2b, the battery 90, which is typically a 6 volt d.c. lantern battery, may be conveniently extracted from lower housing 11 by unscrewing the upper housing 12. During such replacement of the battery, the shape-memory alloy 80 operates much as does a spring within a flashlight, and does not present any problems or obstruction to replacement of the battery 90.

The fixture 1 is normally weather tight in its various sections as required by its intended application. In particular, a number of grommets, or stuffing tubes, 41–43 may be used to seal the only apertures, which pass the electrical wiring, within the moveable member 20 and housing 10. To account for connection to light source 60 and photocell 70 within moveable member 20, expansion loops are formed in the wire in the space or region between moveable member 20 and lower housing 11.

An electrical schematic diagram of the first embodiment of the pop-up light fixture in accordance with the present invention, previously seen in FIG. 1, is shown in FIG. 3. Input 120 v.a.c. power is supplied through the primary of 120/12.6 Volt, 3 amp, transformer 51, typically Radio Shack part no. 12.6 CT. The 12.6 v.a.c. output of such transformer 51 is rectified in bridge rectifier 52, typically Radio Shack part no. 276-1171. The output d.c. power, which is optionally fused by fuse 54 of nominal value 5 amperes, is transmitted via wires 53 to POWER SWITCH CIRCUIT 72 and POWER ANTENNA LIFT MECHANISM 30.

The POWER SWITCH CIRCUIT 72 connects via wire 71 to photosensor, or phototransistor, R3. When bright light is striking the photosensor R3 then its resistance is low. This low resistance keeps the base of transistor Q1, typically type PN 2222, below its turn on point of approximately 0.7 volts. When transistor Q1 is off then the base of transistor Q2, typically type 2N3906, rises to the positive voltage supply, turning transistor Q2 off. In this case the coil 34 within the relay switch 33 of the POWER ANTENNA LIFT MECHANISM 30 is de-energized, causing that no electrical energy should be provided to motor 35 and that the shooting tube assembly 31 (shown in FIG. 1) should remain in the lowered position. The light source 60, which is typically a 12 v.d.c. quartz halogen automotive-type miniature lamp, is also turned off.

The fixture 1 need not be actuated by an ambient light sensor, but may alternatively be actuated by sensing of sound, vibration, shock, motion, pressure or other conditions and occurrences which are commonly sensed by sensors. For example, self-actuated fixtures might serve as security alarms, runway lights, or guidance lights during the passage of moving objects. The fixtures may also be actuated manually, or periodically under control of timer circuit.

When the light reaching photosensor R3 decreases, such as during hours of darkness, then the resistance of such photocell increases. Accordingly, the voltage on the base of transistor Q1 increases. When this voltage on the base of transistor Q1 reaches approximately 0.7 v.d.c., then the transistor Q1 turns on, dropping its collector to base voltage to approximately 0.3 v.d.c. In this case current will flow through resistor R5, and through the base of transistor Q2. This current turns on transistor Q2 and energizes the coil 34 of the RELAY SWITCH 33. The RELAY SWITCH 33 switches to the illustrated, on, position and provides d.c. power to both light source 60 and motor 35.

The power to motor 35 within the power antenna lift mechanism is gated through UP LIMIT switch 36 and DOWN LIMIT switch 37. These switches activate under the forces encountered at full extension of telescoping member 31 (shown in FIG. 1), or alternatively under forces encountered at lesser extensions due to obstructions, so as to disable the continuing provision of power to motor 35. The POWER ANTENNA LIFT MECHANISM 30 is thusly protected against damage if it is unable to fully extend, or retract, the movable member 20 of the pop-up light fixture 1 (shown in FIG. 1).

In the POWER SWITCH CIRCUIT 72, the resistor R6 provides hysteresis. This hysteresis makes the POWER SWITCH CIRCUIT 72 more resistant to noise, and also ensures that the circuit turns fully on and fully off. The capacitor C2 provides a short delay between changes in light level and circuit activation. This delay helps to prevent noise problem and false activation of the POWER SWITCH CIRCUIT 72 and an attendant change in the illuminated/nonilluminated, extended/retracted, position of the pop-up light fixture.

A complete list of the preferred electrical components for the power switch circuit 72 and photocell 70 is given in the following Table 1:

TABLE 1

| Reference | Description |
| --- | --- |
| C1 | 47 uF 25 Volt General purpose electrolytic capacitor (MALLORY VTL47S25, etc.) |
| C2 | 10 uF 16 Volt General purpose electrolytic capacitor (MALLORY VTL10S16, etc.) |
| D1 | 1 Amp 50 PIV General purpose silicon rectifier (e.g. 1N4001) |
| D2 | 1 Amp 50 PIV General purpose silicon rectifier (e.g. 1N4001) |
| D3 | 10 Amp 100 PIV Bridge rectifier (e.g. 100JB1L) |
| R1 | 50K ohm ¼ watt single turn trimmer potentiometer (BOURNS 3386 Series, etc.) |
| R2 | 47K ohm ¼ watt 5% resistor (type MF-25, etc.) |
| R3 | Cadmium Sulphide Photocell (e.g. VT801) |
| R4 | 100K ohm ¼ watt 5% resistor (type MF-25, etc.) |
| R5 | 5.6K ohm ¼ watt 5% resistor (type MF-25, etc.) |
| R6 | 10K ohm ¼ watt 5% resistor (type MF-25, etc.) |
| T1 | 120/12.6 Volt 3 Amp Step down power transformer (STANCOR P-8358, etc.) |
| Q1 | General purpose NPN silicon transistor (e.g. PN2222, 2N3904, etc.) |
| Q2 | General purpose PNP silicon transistor (e.g. 2N3906, etc.) |
| Fuse | 5 Amp Slow Blow Fuse (e.g. 313005) |

In accordance with the preceding explanation, certain adaptations and variations of the present invention will be obvious to a practitioner of the electromechanical design arts. Several alternative types of motorized drive mechanisms could be used to provide electromotive force for elevating, and for retracting, the light fixture. The electromotive means within the pop-up light fixture could be energized for retraction only, and the light fixture could assume and/or hold its extended position under spring or other forces. Latching solenoids and other mechanisms permit that the light fixture will not continuously consume electrical power in a one of its two stable positions.

In accordance with these and other obvious adaptations and alterations of the present invention, the scope of the invention should be determined in accordance with the following claims, only, and not solely in accordance with those preferred embodiments within which the invention has been taught.

We claim:

1. A retractable light fixture comprising:
   a hollow body having an opening;
   a movable member disposed within the body's opening and adapted to slide through the opening between a first position substantially retracted into said body and a second position at least partially extended out of said body;
   a light source means within the body for providing light illumination external to the light fixture when the moveable member is in its second position;
   a shape-memory alloy, connected between the hollow body and the moveable member, responsive to electrical power to electrically resistively heat so as to produce a force for moving the moveable member between at least one of its first and its second positions and the other such position; and
   a switch responsive to an electrical signal for switching electrical power to the shape-memory alloy.

2. The retractable light fixture according to claim 1 wherein the light source means is retained on the moveable member for moving therewith.

3. The retractable light fixture according to claim 1 wherein the light source means comprises:
   an electrical light source means for providing the light illumination in response to electrical energization.

4. The retractable light fixture according to claim 3 further comprising:
   power source means for providing electrical energization to the electrical light source means.

5. The retractable light fixture according to claim 4 wherein the electrical light source means comprises:
   a light bulb; and wherein the power source means comprises:
   a battery.

6. The retractable light fixture according to claim 4 further comprising:
   power switching means for gating the electrical energization to the electrical light source means only upon such times as the moveable member is in its second position.

7. The retractable light fixture according to claim 6 wherein the power switching means is responsive to sensed ambient light levels for gating the electrical energization.

8. The retractable light fixture according to claim 6 wherein the power switching means is further for gating the electrical energization to the electromotive means as the electrical power.

9. The retractable light fixture according to claim 8 wherein the power switching means comprises:
   a photosensor; and
   a switch activated by the photosensor.

10. The retractable light fixture according to claim 4 wherein the power source means comprises:
    a battery.

11. The retractable light fixture according to claim 10 further comprising:
    photovoltaic cell means, electrically connected to the battery, responsive to ambient light illumination for providing an electrical current to charge the battery.

12. The retractable light fixture according to claim 14 wherein the light source means comprises:
    an electrical light source means for providing the light illumination in response to electrical power; and
    wherein the switch is also switching electrical power to the electrical light source means.

13. The retractable light fixture according to claim 12 wherein the shape-memory alloy and the electrical light source means are electrically series connected.

14. The retractable light fixture according to claim 1 further comprising:
    a source of the electrical power that is switched to the shape memory alloy.

15. The retractable light fixture according to claim 14 wherein the source of electrical power comprises:
    a battery.

16. The retractable light fixture according to claim 1 wherein the shape memory alloy is in the shape of wire wound as a spring.

17. A retractable light fixture comprising:
    a hollow body having an opening;
    a source of light;
    a shape memory alloy, connected between the hollow body and the source of light, responsive to an electrical signal for moving by electrical power the source of light from a first position more substantially within the hollow body and retracted from its opening, and a second position more substantially outside the hollow body and extended from its opening; and
    a light sensor means for providing the electrical signal in response to sensed ambient light conditions.

18. The retractable light fixture according to claim 17 further comprising:
    a power source means for providing the electrical power.

19. The retractable light fixture according to claim 18 wherein the source of light comprises:
    an electric light providing illumination in response to electric power.

20. The retractable light fixture according to claim 19 wherein the power source means is further for providing the electrical power to the electric light.

21. The retractable light fixture according to claim 20 further comprising:
    a switch means, electrically connected in series between the power source means and the electric light, for switching the electrical power from the power source means to the electric light in response to the electrical signal.

22. A method of repositioning a terrain lighting fixture comprising:
    sinking a hollow body having an opening into the ground so that the opening is disposed upwards substantially level with ground surface;
    locating an electric light source producing illumination movably within the hollow body;
    positioning an electric lifter within the hollow body where it may serve to lift the electric light source form a first position substantially within the hollow body substantially below ground surface and a second position substantially outside the hollow body extended above ground surface; and
    selectively electrically powering both the electric light source and the electric lifter so that the electric light source will be both lifted from its first to its second position and powered on to produce illumination.

23. The method according to claim 22 wherein the selectively electrically powering comprises:
    sensing ambient light; and
    providing electric power from a source of electric power to the electric light source and the electric lifter when ambient light is sensed to be of low intensity.

* * * * *